US008396456B2

(12) United States Patent
Brackbill et al.

(10) Patent No.: US 8,396,456 B2
(45) Date of Patent: Mar. 12, 2013

(54) VISUAL VOICEMAIL MANAGEMENT

(75) Inventors: Douglas L. Brackbill, Aptos, CA (US);
Ronald J. Fernandez, San Francisco, CA (US); Mark D. Klein, Los Altos, CA (US); Michael J. Kolbly, Milpitas, CA (US); Michael Scott Manzo, Palo Alto, CA (US); Ronald D. Stelter, San Ramon, CA (US)

(73) Assignee: Avaya Integrated Cabinet Solutions Inc., Basking Ridge, NJ (US)

( * ) Notice: Subject to any disclaimer, the term of this patent is extended or adjusted under 35 U.S.C. 154(b) by 739 days.

(21) Appl. No.: 11/475,651

(22) Filed: Jun. 26, 2006

(65) Prior Publication Data

US 2008/0207176 A1    Aug. 28, 2008

Related U.S. Application Data

(60) Provisional application No. 60/694,893, filed on Jun. 28, 2005.

(51) Int. Cl.
*H04M 11/10* (2006.01)

(52) U.S. Cl. ............ 455/413; 455/412.1; 455/566; 455/567; 455/550.1; 379/88.23

(58) Field of Classification Search ............ 455/413, 455/412.1–412.2, 415, 566, 567; 379/88.22, 379/88.23
See application file for complete search history.

(56) References Cited

U.S. PATENT DOCUMENTS

| | | | |
|---|---|---|---|
| 6,751,453 B2 * | 6/2004 | Schemers et al. | 455/412.1 |
| 6,826,407 B1 * | 11/2004 | Helferich | 455/466 |
| 7,110,510 B1 * | 9/2006 | Shaffer et al. | 379/88.25 |
| 7,167,701 B1 * | 1/2007 | Jordan, Jr. | 455/412.2 |
| 7,532,913 B2 * | 5/2009 | Doulton | 455/566 |
| 7,995,720 B2 * | 8/2011 | Moore | 379/88.23 |
| 2002/0098831 A1 * | 7/2002 | Castell et al. | 455/413 |
| 2003/0147519 A1 * | 8/2003 | Jain et al. | 379/211.02 |
| 2003/0228863 A1 * | 12/2003 | Vander Veen et al. | 455/412.1 |
| 2009/0061827 A1 * | 3/2009 | Bulgin et al. | 455/413 |
| 2009/0117880 A1 * | 5/2009 | Sipher | 455/412.2 |

FOREIGN PATENT DOCUMENTS

| | | |
|---|---|---|
| EP | 1379061 A2 | 1/2004 |
| WO | 01/03407 | 1/2001 |
| WO | 2004/095814 A1 | 11/2004 |
| WO | 2004/095821 A2 | 11/2004 |

OTHER PUBLICATIONS

Liebhart, Manfred, "EP Application No. 06785748.2-2414 / 1908264 PCT/US2006025181 European Search Report Jul. 2, 2009", Publisher: EPO, Published in: EP.

Liu, Huiqing, "CN Application No. 200680023712.9 Office Action Nov. 12, 2010", , Publisher: SIPO, Published in: CN.

(Continued)

*Primary Examiner* — Sharad Rampuria
(74) *Attorney, Agent, or Firm* — Maldjian Law Group LLC; John P. Maldjian, Esq.; Alexander D. Walter, Esq.

(57) ABSTRACT

A voicemail message management system and method are provided. A list of voicemail messages is displayed on a screen such as a cellular telephone screen. Indicators specify whether messages are new, urgent, saved, not yet heard, and the like. Other attributes can also be displayed, including for example indications as to source of a message, message duration, date/time, caller, urgent or private, and the like. These indicators provide guidance to the user for selecting which messages he or she would like to hear at a given time. The user can listen to messages, delete them, move them, categorize them, and perform other operations in any order the user chooses.

33 Claims, 6 Drawing Sheets

OTHER PUBLICATIONS

Copenheaver, Blaine R., "PCT Application No. PCT/US2006/025181 International Search Report Feb. 26, 2007", , Publisher: PCT, Published in: PCT.

Copenheaver, Blaine, "PCT Application No. PCT/US2006/025181 International Preliminary Report on Patentability Jan. 17, 2008", , Publisher: PCT, Published in: PCT.

Chinese Patent Application No. 200680023712.9, Communication dated Aug. 25, 2011, Avaya Integrated Cabinet Solutions, Inc., 5 pages.

Liu, Huiqing, "CN Application No. 200680023712.9 Office Action Jun. 9, 2010", Publisher: SIPO, Published in: CN.

* cited by examiner

VISUAL VOICEMAIL MANAGEMENT

CROSS-REFERENCE TO RELATED APPLICATIONS

This application claims priority from U.S. Provisional Application No. 60/694,893 titled "VISUAL VOICEMAIL AND CALL MANAGER," filed Jun. 28, 2005, the disclosure of which is incorporated herein by reference.

FIELD OF THE INVENTION

This invention relates generally to management of voicemail messages, and more specifically to visual techniques for user interaction and management of such messages.

BACKGROUND OF THE INVENTION

Voicemail systems typically notify a user when the user has one or more new messages. This notification can take the form of an icon on a mobile phone or a light (or stutter dial-tone) on a home phone. This scheme may be sufficient for a user who receives an occasional voicemail message, but with the growing use of voicemail, many users have a multitude of new messages to sort through. Most widely-deployed voicemail platforms require the user to listen to messages sequentially. It is difficult for a user to determine which, if any, voicemail messages they want to listen to without listening to at least part of each of his or her new messages.

Mobile phones display call logs that represent all calls received or dialed by the mobile device. On some devices these logs are combined and on other devices they are displayed as separate lists. A typical mobile phone user also has other phones such as an office phone and a home phone. The user has no integrated view of all their phone calls and voicemail messages.

Some systems place voicemail messages in an audio file, attach that file to an e-mail, and send the e-mail to the user. The user can manage their voicemail using their existing e-mail client. There are some disadvantages of mixing voicemail and e-mail, including the following:

- Voicemail files require a large amount of storage space.
- In certain contexts, constraints and requirements exist with regard to preservation of e-mail communications. For example, there may be a requirement to archive e-mail communications for some period of time such as seven years. Many of these requirements do not exist for voicemail communications. Accordingly, converting voicemail messages into email messages can impose constraints and requirements that would not otherwise be present for such messages.
- Spam filters for e-mail are optimized for e-mail and not for voicemail.
- There may be difficulties in keeping the voicemail store in sync with the messages received via email. In some cases, a two-step deletion process is required.
- Users may have difficulty listening to voicemail messages if they are checking email from a computer or device that is not equipped for sound, or that does not have the appropriate audio playback software. Privacy concerns exist as well, when for example the user does not have headphones and plays back a voicemail message on a computer speaker that can be easily overheard.

What is needed, therefore, is an improved technique for managing voicemail messages in a visual way that does not impose the undesired limitations of e-mail-based systems.

SUMMARY

According to the techniques of the present invention, a list of voicemail messages is displayed on a screen. Indicators specify whether messages are new, urgent, saved, not yet heard, and the like. Other attributes can also be displayed, including for example indications as to source of a message, message duration, date/time, caller, urgent or private, and the like. These indicators provide guidance to the user for selecting which messages he or she would like to hear at a given time.

In one embodiment, the message list resembles an e-mail list in an e-mail application. The user interacts with a visual interface to manage the voicemail messages. For example, the user can listen to messages, delete them, forward them, save them, move them to folders, and/or perform other actions.

The visual interface of the present invention can be implemented on any device, including for example a mobile phone, other mobile device, computer, website, or the like.

One skilled in the art will readily recognize from the following discussion that alternative embodiments of the structures and methods illustrated herein may be employed without departing from the principles of the invention described herein.

DETAILED DESCRIPTION OF THE EMBODIMENTS

In one embodiment, the present invention is implemented as a user interface for interacting with and managing voicemail messages on a device such as a cellular telephone. Accordingly, the descriptions and illustrations presented herein set forth the invention in such a context. One skilled in the art will recognize, however, that the techniques described herein can be implemented in any other context. For example, the invention described herein can be implemented as a user interface for interacting with and managing voicemail messages on a computer, handheld computer, personal digital assistant, kiosk, landline telephone, or any other device.

Figure 3A:
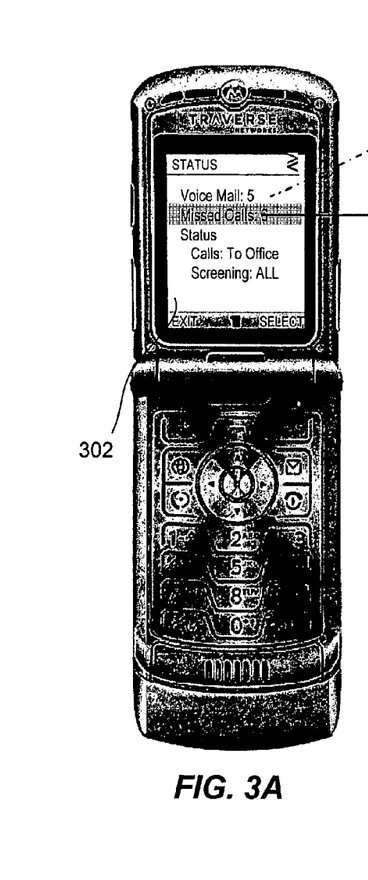
FIGS. 3A-3C are screen shots depicting an additional example of a user interface for a visual voicemail system, where a call log is presented separately from a voicemail message list, according to one embodiment of the present invention.

In one embodiment, the techniques of the present invention are implemented in software on a cellular telephone. One software platform that can be used is Java 2 Platform, Micro Edition (J2ME), although one skilled in the art will recognize that the present invention can be implemented in other platforms as well Referring now to FIG. 1, there is shown a screen shot depicting a launch screen 100 for a visual voicemail system according to one embodiment of the present invention. Launch screen 100 is shown on a cell phone 101. Launch screen 100 is one mechanism for initiating the functionality of the present invention, although one skilled in the art will recognize that the functionality described herein can be initiated by other mechanisms, including automatic or manual initiation techniques. For example, in one embodiment, when a voicemail message is received or a call is missed, an alert is presented to the user. The alert can take any form, including an auditory alert (beep or other sound), vibration alert, visual alert (flashing LED or the like), or any combination thereof. A status screen 302, as shown in FIG. 3A, is displayed, which lets the user know how many voicemail messages have been received and facilitates access to the voicemail message management functionality of the present invention.

Figure 1:
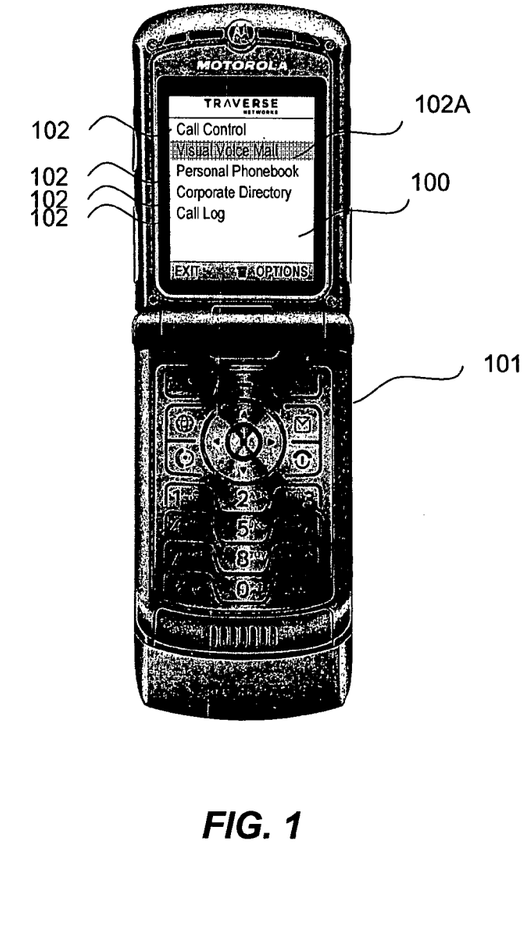
FIG. 1 is a screen shot depicting a launch screen for a visual voicemail system according to one embodiment of the present invention.

In the example shown in FIG. 1, launch screen 100 includes a number of commands 102 for initiating various phone-related functions. One such command is a Visual Voice Mail command 102A, which provides access to the functionality described herein.

Referring now to FIGS. 2A through 2D, there are shown a number of screen shots depicting an example of a user interface for a visual voicemail system according to one embodiment of the present invention. In one embodiment, a Voicemail screen 200 is shown on cell phone 101 in response to the user activating Visual Voice Mail command 102A shown in FIG. 1. Voicemail screen 200 includes a list 207 of voicemail messages. Various icons and indicators specify which messages are new, saved, urgent, and the like. Additional attributes can also be shown, including for example the telephone number from which the voicemail originated the identity of the caller, and the like. As described below, such information can be shown directly in list 207 or can be accessed by selecting an item from list 207. List 207 may be scrollable if there are more messages than can reasonably be shown on screen 200.

Figures 2A, 2B:
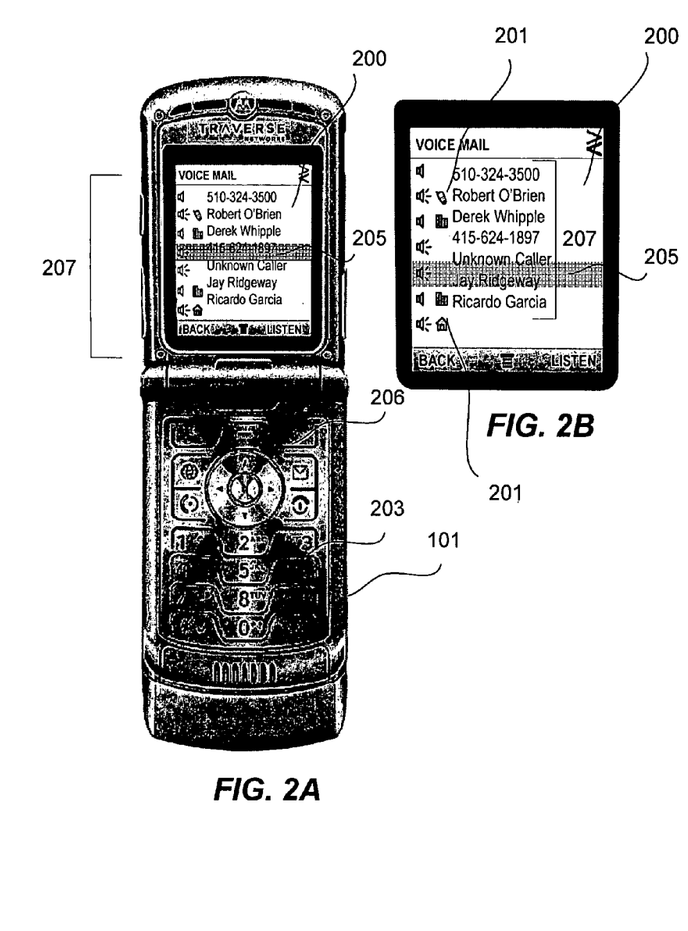
FIGS. 2A-2D are screen shots depicting an example of a user interface for a visual voicemail system according to one embodiment of the present invention.
Figure 2C:
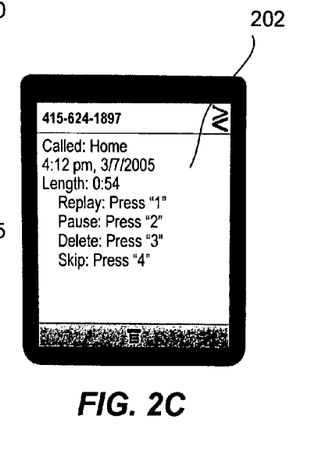

Screen 200 as shown in FIGS. 2A and 2B depicts some examples of listed messages, including telephone numbers for some, names for others, and icons 201 indicating whether the voicemail message originated from the caller's cell phone, home phone, or work phone. One skilled in the art will recognize that other information can also be shown, depending on user preferences, display size, and other factors; such other information can include length, time of call, urgency, privacy level, telephone number from which the call originated, telephone number called, listened-to state, saved state, caller-supplied text message, directory name (from a personal, corporate, public, or other directory) of the caller, and the like. In one embodiment, such information is shown in response to the user highlighting a particular voicemail message; in such an embodiment, the information can be shown on the same screen 200 (for example in a pop-up window or by expanding the region of screen 200 devoted to the highlighted item), or on a details screen 202 as shown in FIG. 2C.

Messages can be listed in chronological order, or in order of priority, or in whatever order the user wishes. Voicemail screen 200 thus provides an at-a-glance view of received messages in whatever format and sequence is desired.

The user can manage voicemail messages by interacting with screen 200 or 202. In one embodiment, numeric keys on keypad 203 of cell phone 101 correspond to various functions that can be performed on messages. In another embodiment, the user can navigate among commands in an on-screen menu using navigational controls 204 of cell phone 101.

In one embodiment, the user selects a message by moving a highlight 205. Activating the message (for example by clicking on center button within navigational controls 204, or by clicking on a softkey 206 corresponding to a "listen" command) causes the message to be played. In one embodiment, details screen 202 is shown while the message is being played. The user can press the "1" key to replay the message, the "2" key to pause it, the "3" key to delete it, or the "4" key to skip it. Other commands are also possible, for example skipping forward or backward by a certain number of seconds, or slowing down or speeding up playback. Also, commands can be provided for tagging a message.

In one embodiment, the present invention allows a user to listen to voicemail messages without requiring the user to dial into a voicemail system. Users need only select the voicemail message from screen 200 and indicate that the message should be played.

Figure 2D:
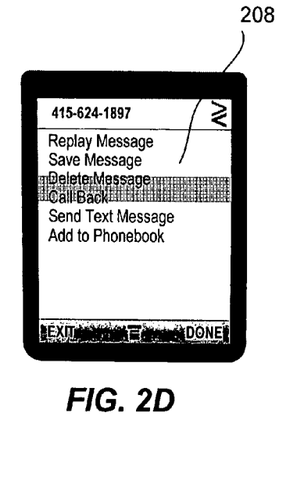

As shown in FIG. 2D, the user can also access an additional action screen 208 containing more options and commands that can be performed on a particular voicemail message. The user can select among the displayed options and commands, for example using navigational controls 204 of cell phone 101.

As mentioned above, the user interface for interacting with and managing voicemail messages can be implemented on any type of device or machine. Accordingly, the screens depicted here are intended to be illustrative of one embodiment. One skilled in the art will recognize that other configurations and mechanisms may be appropriate depending on the type and capabilities of the device being used.

In one embodiment, list 207 displayed to the user in screen 200 can also include calls that did not result in voicemail. Accordingly, list 207 can form a call log including incoming and outgoing calls for any number of phone numbers, which may or may not include telephone numbers other than those associated with the device. Incoming calls that result in voicemail messages can be flagged using an icon. Messages not associated with a call, such as inter-system messages and broadcast messages, can also be displayed in the call log, voicemail message list 207, or in both. In one embodiment, different message types are flagged by displaying an identifying icon next to the message element in the list 207.

Figure 3B:
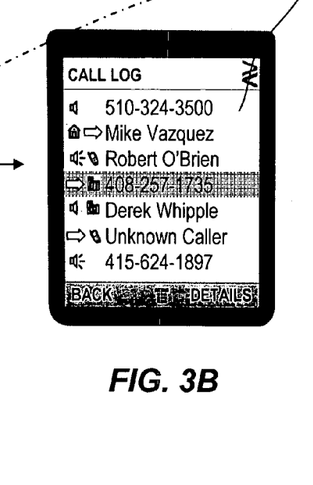
Figure 3C:
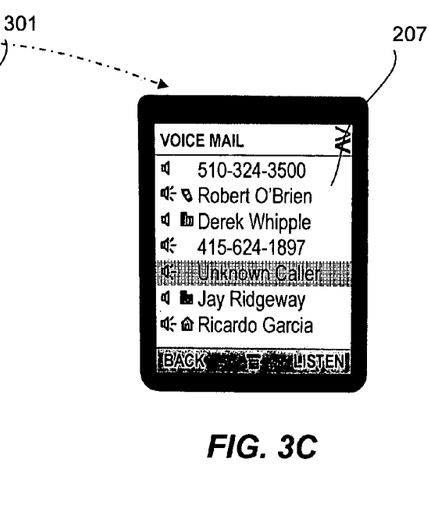

In one embodiment, as shown in FIGS. 3A-3C, call log 301 is presented as a separate list from voicemail list 207. Status screen 302 allows the user to select which of the two should be displayed. In one embodiment, status screen 302 shows how many entries are in call log 301 (indicated as "missed calls") and how many voicemail messages are in list 207. As discussed above, in one embodiment status screen 302 is presented when an alert is issued signifying a missed call or received voicemail message.

In one embodiment, the system of the present invention gathers call log information from multiple sources including private branch exchanges (PBX), mobile switch centers, and/or land-line switches. The system can draw information from multiple voicemail platforms allowing a user to see, listen to, and manage their home, office, mobile, and other voicemail. The system can display all of a user's voicemail from multiple sources (platforms) interleaved into a list in chronological order, as a separate list for each source, or as a list sorted in some other way. Management commands (listen, save, delete, etc.) made by the user on a particular message are translated by the invention to the necessary Application Programming Interface (API), or other interface, needed to execute the command on the voicemail platform containing the message. In this way, the message store platform is kept synchronized, by the invention, with actions (such as delete, listen to, save, etc.) taken by the user from the remote device.

In one embodiment, voicemail messages are stored in a central location (or in one or more locations), and are retrieved in response to a user request to listen to a message. In another embodiment, voicemail messages are pre-fetched and stored locally at the device 101. Maintaining a local cache of voicemail messages in this manner enables the system of the present invention to provide quicker access to voicemail messages, and can even allow users to listen to their voicemail messages from locales where no connection is available (for example on an airplane).

In one embodiment, operations performed on the voicemail messages via the techniques described herein are synchronized with a central voicemail message store (or with the appropriate voicemail store if there are more than one), so that the system integrates with existing voicemail systems. For example, if a user deletes a voicemail message using the deletion command of the present invention, the voicemail message would also be deleted in the central store of voicemail messages.

The user may reply to a call or voicemail message by placing a call, sending a voicemail message, text message, e-mail, instant messaging, or in other ways. Reply addressing information comes from the voicemail platform(s), a database internal to the invention, a directory (corporate or other), or from other sources. When the user decides to leave a voicemail message as a reply, or to forward a voicemail message:

1. A call can be placed by the device directly to the original caller's voicemail platform. The call can be placed to the pilot telephone number of voicemail platform and the device can inform the platform which user is being messaged by sending identifying data over a data channel in the background (or through DTMF on the voice channel)

2. A message can be recorded on the device and sent to the caller's voicemail platform. In this case the greeting of the called person can be streamed to the user's device for playback to the user to confirm they are messaging the correct person.

In making the decision whether to reply to a voicemail by placing a return call or by sending a return voicemail (or to defer any reply), the user may consider the presence of the caller. "Presence", used in this sense, refers to the individual's availability to receive a call, and can include an indication as to whether the individual is in a meeting, at home, in transit, and the like. Accordingly, a presence indicator (such as an icon) can be shown in list 207 adjacent to the call and/or the voicemail. Alternatively, the item within list 207 can be shown in bold face or some other distinctive typeface to indicate the presence of the caller. Presence indicators assist the user in deciding when and how (direct call or voicemail message) to respond to the caller's voicemail.

In one embodiment, a caller can specify a subject to be associated with a voicemail message. This subject can be displayed in the visual message list, so as to give an indication to the called party as to the subject matter of the voicemail message. The subject can be composed using speech recognition, text entry, selection from a pre-populated list (general or personalized), from a hierarchical selection process, or using a context-sensitive selection process (for example: first selection is from I/You/We, etc, next selection is from common verbs, and the final selection is common direct objects). The user can also associate a subject to a reply voicemail.

Responsive to a user's indication that a voicemail messages should be played back, the system of the present invention can perform one of the following operations:

1. Retrieve the message from the voicemail platform and allow the user to play it on the device.
2. Retrieve the message from the voicemail platform and stream it to the device.
3. Dial into the voicemail platform and connect the user to an Interactive Voice Response (IVR) that plays the message to the user. The proper message can be pre-selected using DTMF signaling or sending an identification command to the voicemail platform through the data-channel.
4. Play the message that has already been sent to the device. In this case, when the system detects a new message in one of the user's voicemail platforms, it retrieves that message and sends it to the device (shortly after the message is deposited on the voicemail platform and in advance of the user taking any action). This technique has some advantages as messages are instantly available to the user (when the user becomes aware of the message) even on a low-bandwidth device and messages are available even when the device is not connected to the data or voice network (such as on an airplane).

In one embodiment, a Short Message Service (SMS) message is used to wake up the device and cause it to retrieve and store the voicemail message. In an alternative embodiment, polling is performed: the device periodically checks to see if the server has any messages for it to retrieve and store. Having messages stored on the device facilitates the forwarding of messages through a data connection.

In one embodiment, a return call to the sender, or to the sender's voicemail box, can easily be made from the screen 200 that shows voicemail messages.

Figure 6:
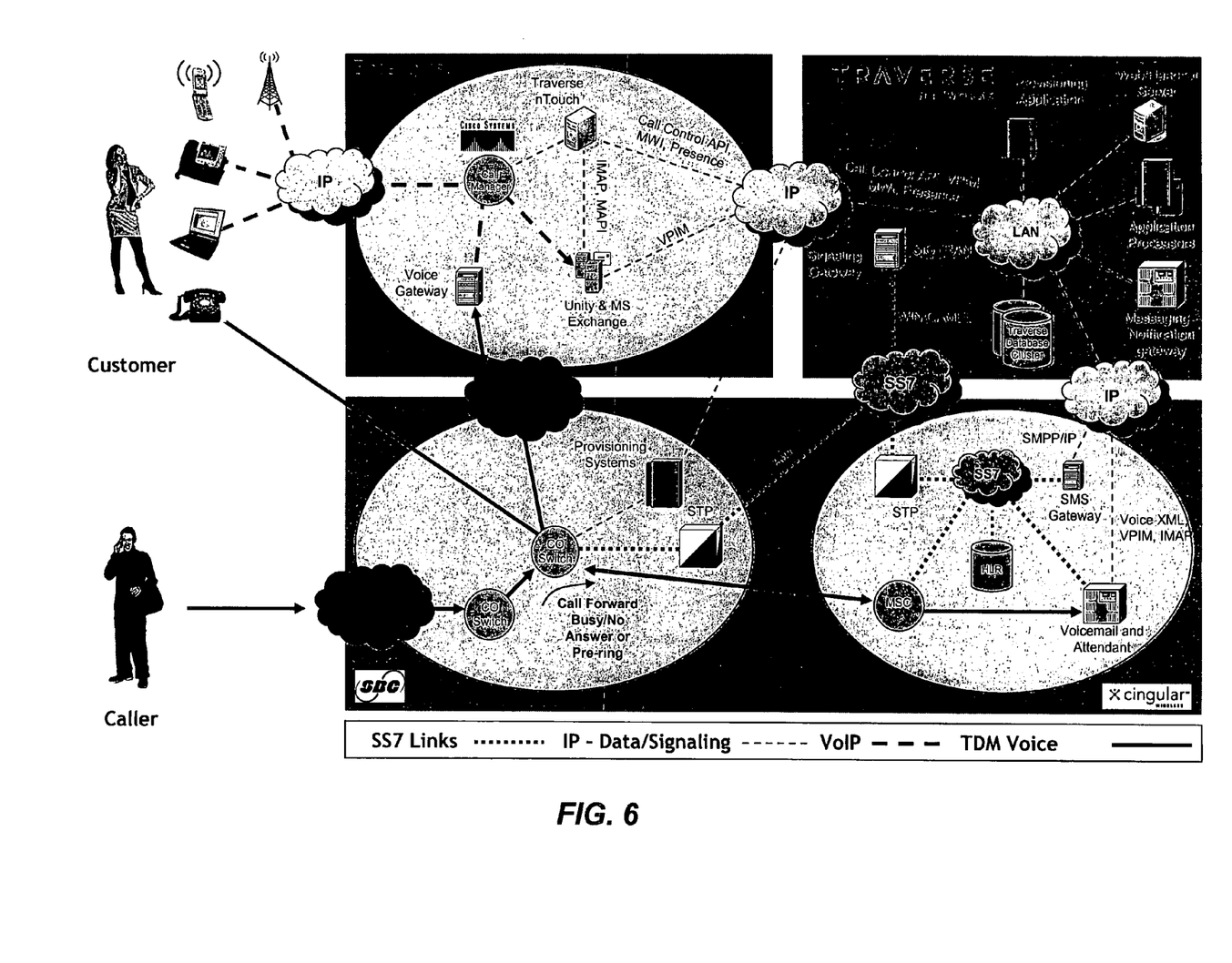
FIG. 6 is a flowchart depicting a method for making a call in response to a voicemail message.

Referring now to FIG. 6, there is shown a method for making a call in response to a voicemail message. A user selects 601 a voicemail message from list 207 and requests 602 that the original caller be called back. This request can be made, for example, by selecting a "Call Back" command from screen 208 as shown in FIG. 2D.

In response to the user request, the telephone system initiates 603 a call to the user and 605 to the original caller, and bridges the two calls so that the two parties can talk to one another.

In one embodiment, after the call to the user has been initiated 603, the user answers 604 the call and enters an acknowledgment before the telephone system initiates 605 the call to the original caller. For example, the user may be instructed to press a key, such as the pound sign "#", so as to confirm that he or she has answered the phone and is ready to talk to the original caller. Only then does the telephone system proceed with initiating 605 the call to the original caller.

The telephone system then bridges 606 the two calls, so that the user can talk 607 to the original caller or leave a message for the original caller.

In one embodiment, the user can request that the telephone system call the user at any arbitrary telephone number. Accordingly, the "Call Back" command may include options for other telephone numbers where the user can be reached. If the user wishes to be called on a landline, for example, he or she can so indicate. Such functionality is also useful if the device on which the voicemail messages are retrieved does not itself have telephone capability. In one embodiment, the telephone system can call the user at a number where the user is known to be reachable, whether or not the user has specified the number.

The caller ID for the call to the original caller can be set to the caller ID of the user's desk phone to give the appearance to the original caller that the user is calling from his or her office.

A junk-voicemail (call) filter can be applied by the invention using a database of known "junk callers." This database can take user feedback to identify junk callers. For example, if a user marks a voicemail (or call) as "junk" and some number of other users do the same to voicemails (or calls) from the same caller then all that caller's messages (or calls) to any user could be marked as "suspect" or be automatically deleted.

Different voicemail platforms have different sets of IVR commands to control the management of voicemail messages. For example, pressing 3 on some voicemail platforms deletes a message while key 7 is used for that function on other platforms. In one embodiment, the system of the present invention can be personalized by a user to emulate the commands of another voicemail platform.

In one embodiment, the system of the present invention allows multiple devices (clients) to access the same set of a user's voicemail boxes. The system automatically synchronizes all clients and all voicemail boxes.

Architecture

Figure 4:
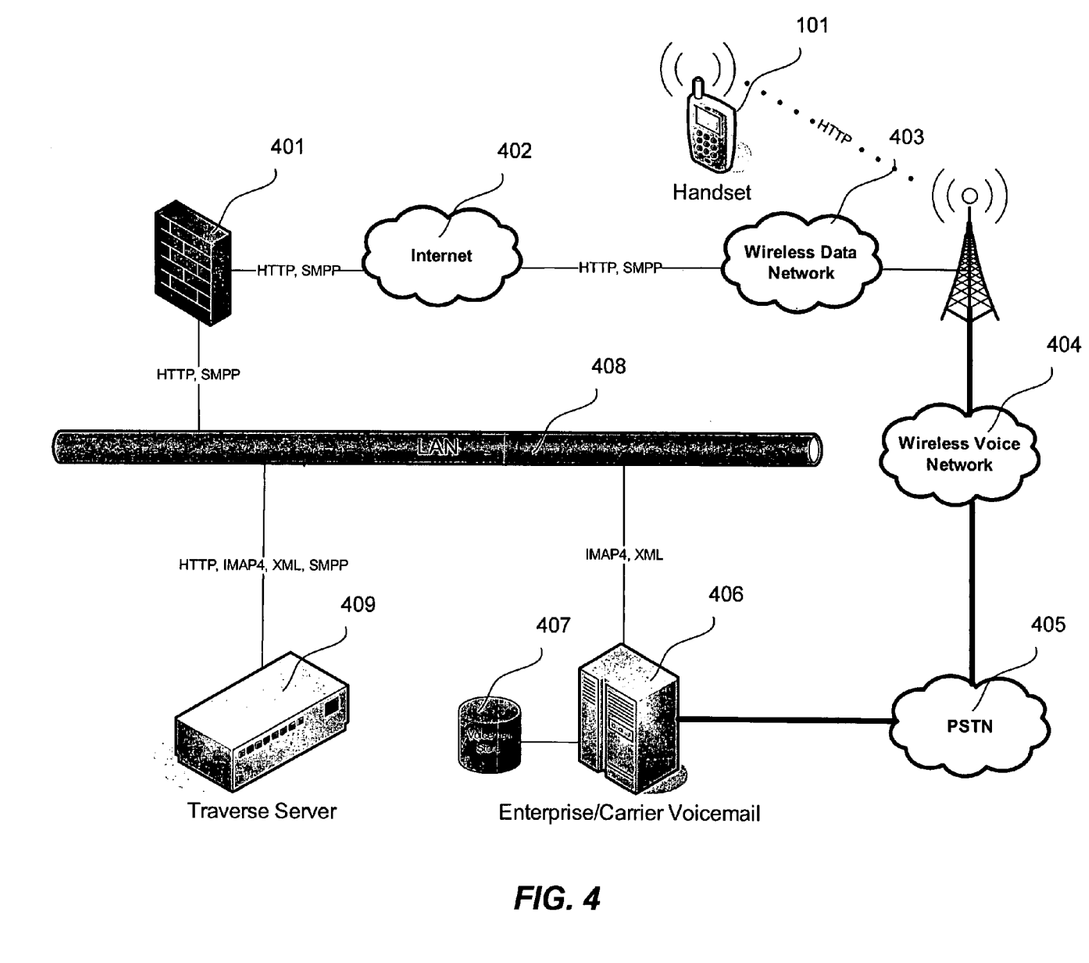
FIG. 4 is a block diagram depicting an architecture for implementing the present invention according to one embodiment.

Referring now to FIG. 4, there is shown an architecture for implementing the present invention according to one embodiment. Server 409 provides the functionality for voicemail management described herein. Server 409 accesses messages stored in voicemail store 407 and made available via voicemail system 406. Server 409 and voicemail system 406 are connected to local area network (LAN) 408 that facilitates communication between server 409 and voicemail system 406 using any known communication protocol such as HTTP, IMAP4, XML, SMPP, or the like, or any combination thereof.

Handset (which may be a cell phone 101) communicates with server 409 using a communication protocol such as HTTP, to receive information about voicemail messages and to initiate requests for playback and management of such messages under user control. In one embodiment, such communication takes place via wireless data network 403 and over the Internet 402 using well-known digital communication techniques. In one embodiment, LAN 408 is protected by firewall 401, and communications via wireless data network 403 are authenticated so that they can be permitted to pass through firewall 401.

Cell phone 101 is also in communication with wireless voice network 404 and Public Switched Telephone Network (PSTN) 405 via known techniques for mobile telephone implementation. Conventional dial-in to voicemail system 406 is facilitated via voice network 404 and PSTN 405, although in some situations such dial-in may be rendered unnecessary in view of the direct digital communication capability between cell phone 101 and server 409.

The system of the present invention is capable of operation in connection with legacy and IP based networks (legacy and standards-based voicemail, etc.) The invention can access voicemail platforms using IP/VOIP/SIP/MAPI/IMAP/PI-MAP (Push IMAP) and/or other standards and protocols.

Figure 5:
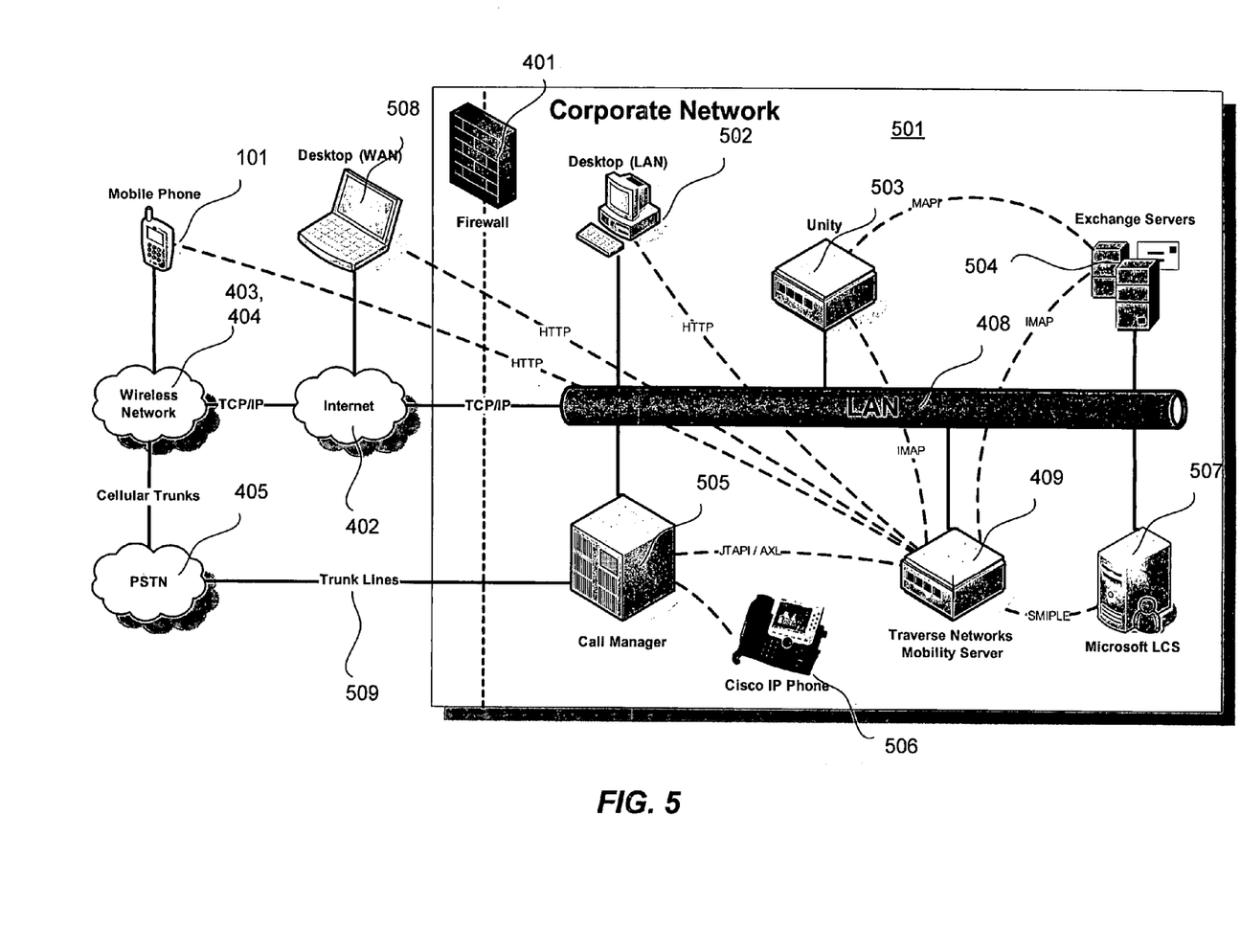
FIG. 5 is a block diagram depicting integration of a visual voicemail architecture within an enterprise architecture according to one embodiment.

Referring now to FIG. 5, there is shown an architecture in which the visual voicemail techniques of the present invention are integrated with an enterprise architecture. Here, the present invention is implemented in conjunction with corporate network 501. Components such as firewall 401, LAN 408, server 409 are located within network 501. Desktop computer 502, also located within network 501, communicates with server 409 via LAN 408, while computer 508 located outside network 501 communicates with server 409 via a wide-area network (WAN, not shown). Either computer 502 or 503 can be used to control the operation of server 409 via HTTP-based communication.

In general, the operation of the architecture shown in FIG. 5 is similar to that of FIG. 4. Also located within network 501 are additional components which can integrate with the system described herein. Unity server 503, available from Cisco Systems, Inc. of San Jose, Calif., provides email and voicemail integration and can communication with Exchange servers 504 and server 409 using MAPI and/or IMAP protocols, for example via LAN 408. Exchange servers 504 handle email communications and can communicate with Live Communications Server (LCS) 507; both of these components use technologies available from Microsoft Corporation of Redmond, Wash. Call Manager 505 handles incoming and outgoing telephone calls, and communicates with PSTN 405 via trunk lines according to conventional techniques. In one embodiment, call manager 505 interacts with IP phones 506 such as those available from Cisco Systems.

Server 409 communicates with call manager 505 to cause the selective re-routing of calls originally placed the user's PBX extension, for example using JTAPI/AXL protocols. Server 409 also communicates with LCS 507, for example to retrieve and update corporate directory information.

Server 409 retrieves and manages user voicemail messages by communicating directly with one or more voicemail stores, servers 504, and/or indirectly through a voicemail platform 503. Server 409 can be administered (configured and maintained) using a computer on the LAN 502. A visual voicemail display can be retrieved from server 409 from a desk phone 506.

The system of the present invention provides several advantages over conventional techniques for managing voicemail messages. For example:

The user may view voicemails independently from e-mail. The user does not have to open and play voicemail files stored as attachments to their e-mails.

The invention can be implemented using a wide range of devices, including desktop computers, mobile phones, and personal digital assistants.

The invention provides integrated viewing and manipulating of voicemail messages stored on a multitude of voicemail platforms.

The user need not dial in to a voicemail system to hear and manage voicemail messages. Direct access and manipulation of messages is facilitated.

The invention provides an easy way for the called party to see attributes of voicemail messages, including for example the telephone number the caller dialed, a subject for the message, and the like.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   receiving, by a first telecommunications terminal from a voicemail management system:
   (i) a first plurality of voicemail indicia associated with voicemails stored on a first voicemail platform, and
   (ii) a second plurality of voicemail indicia associated with voicemails stored on a second voicemail platform;
   displaying, by the first telecommunications terminal, the first plurality of voicemail indicia and the second plurality of voicemail indicia interleaved in a chronological order;
   receiving, by the first telecommunications terminal, a user input selecting a voicemail indicium from among the indicia that are displayed at the telecommunications terminal;
   transmitting to the voicemail management system, by the first telecommunications terminal, a signal to retrieve a voicemail message that is associated with the selected voicemail indicium; and
   receiving, by the first telecommunications terminal, the voicemail message from the voicemail management system, wherein the voicemail message is streamed from the voicemail management system to the first telecommunications terminal,
   wherein the voicemail management system interleaves the first plurality of voicemail indicia and the second plurality of voicemail indicia into the chronological order that is displayed by the first telecommunications terminal.

2. The method of claim 1 further comprising:
   storing the voicemail message in a memory of the first telecommunications terminal.

3. The method of claim 2 wherein the first telecommunications terminal enables the user to access the voicemail message from the memory when the first telecommunications terminal does not have network connectivity.

4. The method of claim 1 further comprising:
   receiving, by the first telecommunications terminal from the voicemail management system, presence information of one or more callers associated with at least one of the first plurality of voicemail indicia and the second plurality of voicemail indicia.

5. The method of claim 4 further comprising:
   displaying, by the first telecommunications terminal, an indicator of the presence information of the one or more callers;
   wherein the indicator of the presence information is displayed adjacent to each corresponding voicemail indicium of the first plurality of voicemail indicia and the second plurality of voicemail indicia.

6. The method of claim 5 wherein the indicator is indicative of whether the one or more callers are available to answer a call.

7. The method of claim 5 wherein the indicator is indicative of a locale of the one or more callers.

8. The method of claim 1 further comprising:
   receiving, by the first telecommunications terminal, a user input selecting a voicemail indicium from among the indicia that are displayed at the telecommunications terminal; and
   transmitting, by the first telecommunications terminal, a signal to the voicemail management system, wherein the signal is to establish a communications session with a user of a second telecommunications terminal corresponding to the selected voicemail indicium; and wherein the signal instructs the voicemail management system to transmit a telephone number of a third telecommunications terminal to the second telecommunications terminal as a caller identification of the first telecommunications terminal.

9. The method of claim 1 further comprising:

periodically transmitting, by the first telecommunications terminal to the voicemail management system, a signal to poll the first voicemail platform and the second voicemail platform for voicemail indicia.

10. The method of claim 1 further comprising:

receiving, by the first telecommunications terminal, a user input selecting a voicemail indicium from among the indicia that are displayed at the telecommunications terminal;

transmitting, by the first telecommunications terminal to the voicemail management system, a first signal to delete a voicemail message that is associated with the selected voicemail indicium;

wherein, in response to receiving the first signal from the first telecommunications terminal, the voicemail management system:
 (i) deletes the voicemail message that is stored at the voicemail management system, and
 (ii) transmits a second signal to the first voicemail platform to delete a corresponding voicemail message that is stored at the first voicemail platform.

11. The method of claim 1 further comprising:

receiving, by the first telecommunications terminal, a first signal from the voicemail management system, wherein the signal causes the first telecommunications terminal to transition from an idle state to an active state; and transmitting, by the first telecommunications terminal to the voicemail management system, a second signal to retrieve a voicemail indicium from the voicemail management system.

12. The method of claim 1 further comprising:

receiving, by the first telecommunications terminal from a user of the first telecommunications terminal, an input to exclude a voicemail indicium that is associated with a user of a second telecommunications terminal;

transmitting, by the first telecommunications terminal to the voicemail management system, a signal to exclude the voicemail indicium that is associated with the user of the second telecommunications terminal; and receiving, by the first telecommunications terminal from the voicemail management system, a third plurality of voicemail indicia, wherein the voicemail management system excludes from the third plurality of voicemail indicia all voicemail indicia that are associated with the user of the second telecommunications terminal based on the input.

13. The method of claim 1 wherein the first telecommunications terminal is a wireless telecommunications terminal.

14. The method of claim 1 wherein the first voicemail platform is connected to a first network that is different from a second network to which the second voicemail platform is connected.

15. A method comprising:

receiving by a voicemail management system:
 (i) a first plurality of voicemail indicia associated with voicemails stored on a first voicemail platform, and
 (ii) a second plurality of voicemail indicia associated with voicemails stored on a second voicemail platform;

interleaving, by the voicemail management system, the first plurality of voicemail indicia and the second plurality of voicemail indicia into a list of indicia that are in chronological order;

transmitting, by the voicemail management system, the list of indicia to a first telecommunications terminal;

receiving, by the voicemail management system, a signal from the first telecommunications terminal, wherein the signal is indicative of a voicemail indicium selected from the list of indicia by a user of the first telecommunications terminal; and streaming, by the voicemail management system, a voicemail message that is associated with the selected voicemail indicium to the first telecommunications terminal in response to receiving the signal.

16. The method of claim 15 further comprising:

receiving by the voicemail management system from the first voicemail platform and the second voicemail platform, presence information of one or more callers who are correspondingly associated with the first plurality of voicemail indicia and the second plurality of voicemail indicia; and transmitting, by the voicemail management system to the first telecommunications terminal, an indicator of the presence information of the one or more callers.

17. The method of claim 16 wherein the indicator is indicative of whether the one or more callers are available to answer a call.

18. The method of claim 16 wherein the indicator is indicative of a locale of the one or more callers.

19. The method of claim 15 further comprising:

receiving, by the voicemail management system, a signal from the first telecommunications terminal, wherein the signal is indicative of a voicemail indicium selected from the list of indicia by a user of the first telecommunications terminal; and establishing, by the voicemail management system, a communications session between the first telecommunications terminal and a second telecommunications terminal after receiving the signal;

wherein a telephone number of a third telecommunications terminal is transmitted by the voicemail management system to the second telecommunications terminal as a caller identification of the first telecommunications terminal.

20. The method of claim 15 further comprising:

periodically receiving, by the voicemail management system, a signal from the first telecommunications terminal to poll the voicemail management system for other voicemail indicia.

21. The method of claim 15 further comprising:

receiving, by the voicemail management system, a signal from the first telecommunications terminal to synchronize the first voicemail platform and the second voicemail platform with the voicemail management system.

22. The method of claim 15 further comprising:

transmitting, by the voicemail management system, a first signal to the first telecommunications terminal, wherein the first signal causes the first telecommunications terminal to transition from an idle state to an active state;

receiving, by the voicemail management system, a second signal from the first telecommunications terminal when the first telecommunications terminal transitions from the idle state to the active state; and transmitting, by the data-processing system, the list of indicia to the first telecommunications terminal based on the second signal.

23. The method of claim 15 further comprising:
receiving, by the voicemail management system, a signal from the first telecommunications terminal to exclude from a third plurality of voicemail indicia any voicemail indicia that are associated with a user of a second telecommunications terminal; and
transmitting, by the voicemail management system to the first telecommunications terminal, the third plurality of voicemail indicia, wherein the voicemail management system excludes from the third plurality of voicemail indicia all voicemail indicia that are associated with the user of the second telecommunications terminal based on the signal.

24. The method of claim 15 wherein the first voicemail platform is connected to a first network that is different from a second network to which the second voicemail platform is connected.

25. A voicemail management system comprising:
a server having a connection to a local area network, wherein the connection enables the server to communicate with a first voicemail platform and a second voicemail platform, and wherein the server is operative to:
receive a first plurality of voicemail indicia associated with voicemails stored on the first voicemail platform, and a second plurality of voicemail indicia associated with voicemails stored on the second voicemail platform;
interleave the first plurality of voicemail indicia and the second plurality of voicemail indicia into a list of indicia in a chronological order that is to be displayed by a first telecommunications terminal;
transmit the list in the chronological order to the first telecommunications terminal;
receive a signal from the first telecommunications terminal, wherein the signal is indicative of a voicemail indicium selected from the list of indicia by a user of the first telecommunications terminal; and
stream a voicemail message that is associated with the selected voicemail indicium to the first telecommunications terminal in response to receiving the signal.

26. The voicemail management system of claim 25, wherein the server is further operative to:
receive from the first voicemail platform and the second voicemail platform, presence information of one or more callers who are correspondingly associated with the first plurality of voicemail indicia and the second plurality of voicemail indicia; and
transmit to the first telecommunications terminal, an indicator of the presence information of the one or more callers.

27. The voicemail management system of claim 26 wherein the indicator is indicative of whether the one or more callers are available to answer a call.

28. The voicemail management system of claim 26 wherein the indicator is indicative of a locale of the one or more callers.

29. The voicemail management system of claim 25, wherein the server is further operative to:
receive a signal from the first telecommunications terminal, wherein the signal is indicative of a voicemail indicium selected from the list of indicia by a user of the first telecommunications terminal; and
establish a communications session between the first telecommunications terminal and a second telecommunications terminal after receiving the signal;
wherein a telephone number of a third telecommunications terminal is transmitted by the server to the second telecommunications terminal as a caller identification of the first telecommunications terminal.

30. The voicemail management system of claim 25, wherein the server is further operative to:
periodically receive a signal from the first telecommunications terminal to poll the voicemail management system for other voicemail indicia.

31. The voicemail management system of claim 25, wherein the server is further operative to:
receive a signal from the first telecommunications terminal to synchronize the first voicemail platform and the second voicemail platform with the voicemail management system.

32. The voicemail management system of claim 25, wherein the server is further operative to:
transmit a first signal to the first telecommunications terminal, wherein the first signal causes the first telecommunications terminal to transition from an idle state to an active state;
receive a second signal from the first telecommunications terminal when the first telecommunications terminal transitions from the idle state to the active state; and
transmit the list of indicia to the first telecommunications terminal based on the second signal.

33. The voicemail management system of claim 25, wherein the server is further operative to:
receive a signal from the first telecommunications terminal to exclude from a third plurality of voicemail indicia any voicemail indicia that are associated with a user of a second telecommunications terminal; and
transmit to the first telecommunications terminal, the third plurality of voicemail indicia, wherein the server excludes from the third plurality of voicemail indicia all voicemail indicia that are associated with the user of the second telecommunications terminal based on the signal.

* * * * *